(12) United States Patent
Hester et al.

(10) Patent No.: US 12,539,984 B2
(45) Date of Patent: Feb. 3, 2026

(54) BATTERY-FREE UNMANNED AERIAL VEHICLE

(71) Applicants: Northwestern University, Evanston, IL (US); Board of Regents, The University of Texas System, Austin, TX (US)

(72) Inventors: Josiah David Hester, Evanston, IL (US); Rishabh Goel, Evanston, IL (US); VP Nguyen, Arlington, TX (US); Tien Pham, Arlington, TX (US)

(73) Assignees: Northwestern University, Evanston, IL (US); Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 18/327,660

(22) Filed: Jun. 1, 2023

(65) Prior Publication Data

US 2023/0391479 A1 Dec. 7, 2023

Related U.S. Application Data

(60) Provisional application No. 63/348,182, filed on Jun. 2, 2022.

(51) Int. Cl.
*B64U 10/40* (2023.01)
*B64D 27/359* (2024.01)
*B64U 30/40* (2023.01)
*B64U 50/31* (2023.01)

(52) U.S. Cl.
CPC ........... *B64U 10/40* (2023.01); *B64D 27/359* (2024.01); *B64U 30/40* (2023.01); *B64U 50/31* (2023.01)

(58) Field of Classification Search
CPC ....... B64C 33/00; B64C 33/02; B64C 33/025; B64U 10/40; A63H 27/008; B64D 27/359
See application file for complete search history.

(56) References Cited

U.S. PATENT DOCUMENTS

| | | | |
|---|---|---|---|
| 6,769,949 B2 * | 8/2004 | Kim | A63H 27/008 244/22 |
| 11,264,158 B2 * | 3/2022 | Sturcken | B64U 50/19 |
| 2003/0096553 A1 * | 5/2003 | Kim | A63H 27/008 446/35 |

(Continued)

FOREIGN PATENT DOCUMENTS

| | | | | |
|---|---|---|---|---|
| CN | 113002772 A | * | 6/2021 | ............. B64C 3/546 |
| CN | 114248918 A | * | 3/2022 | ............. B64C 33/02 |
| KR | 200277500 Y1 | * | 6/2002 | ........... A63H 27/008 |

*Primary Examiner* — Joseph W Sanderson
(74) *Attorney, Agent, or Firm* — Benesch Friedlander Coplan & Aronoff LLP

(57) ABSTRACT

Unmanned aerial vehicles are provided. In one aspect, the unmanned aerial vehicle includes a four-bar linkage mechanism in mechanical communication with a pair of wings. An electrical subsystem includes an actuator in mechanical communication with the four-bar-linkage mechanism. The actuator is in electrical communication with a capacitor. A plurality of solar panels is in electrical communication with the capacitor, which is configured to harvest non-battery energy from the plurality of solar panels to power the actuator for controlling the four-bar linkage mechanism to operate the pair of wings.

20 Claims, 8 Drawing Sheets

(56) References Cited

U.S. PATENT DOCUMENTS

| | | | |
|---|---|---|---|
| 2006/0049306 A1* | 3/2006 | Kim | A63H 27/008 |
| | | | 244/72 |
| 2016/0244144 A1* | 8/2016 | Karem | H04B 7/18506 |
| 2017/0033247 A1* | 2/2017 | Sarabandi | H01L 27/142 |
| 2020/0152364 A1* | 5/2020 | Sturcken | H01L 23/5227 |
| 2021/0380268 A1* | 12/2021 | Ruppert | H05K 7/20854 |
| 2023/0036722 A1* | 2/2023 | Hanamitsu | F02D 29/06 |

\* cited by examiner

| Solar Cell | Chemistry | Electrical | | | Mechanical | | | Efficiency | |
|---|---|---|---|---|---|---|---|---|---|
| | | V | I | P | Area | Mass | | P/Area | P/Mass |
| Ascent Bare Cell[1] | CIGS | 4.8 | 0.17 | 0.816 | 84 | 1 | | 0.155 | 0.816 |
| Azure Multi-junction [2] | GaInP/GaAs/Ge | 3.025 | 0.433 | 1.31 | 30.18 | 2 | | 0.347 | 0.655 |
| Maxeon Gen II [73] | Monocrystalline Si | 0.58 | 6 | 3.48 | 153 | 6.5 | | 0.227 | 0.535 |

FIG. 8

BATTERY-FREE UNMANNED AERIAL VEHICLE

CROSS-REFERENCE TO RELATED APPLICATIONS

The present application claims the benefit of priority under 35 U.S.C. § 119 from U.S. Provisional Patent Application Ser. No. 63/348,182 entitled "Battery-free Unmanned Aerial Vehicle," filed on Jun. 2, 2022, the disclosure of which is hereby incorporated by reference in its entirety for all purposes.

TECHNICAL FIELD

The present disclosure generally relates to unmanned aerial vehicles, and more specifically relates to battery-free unmanned aerial vehicles.

BACKGROUND

Drones have been promoted to be a transformative technology that will support various applications over the next decade, including, for example, military training, search and rescue, logistics, precision agriculture, and aerial photography. Also referred to as Unmanned Aerial Vehicle (UAVs) or Unmanned Aircraft Systems (UASs), UAVs can be used to gain realistic training experiences, test equipment, and tactics in preparation for missions. Many logistic companies are putting much efforts in building automatic UAV-based delivery systems. For example, pilot studies involving automatic delivery UAVs have been conducted at multiple cities around the world. As other examples, UAVs have also been proposed for use in severe conditions to chase storms, hunt hurricane, detect and monitor wildfires, and others uses. Many are also pursuing UAVs for agriculture, such as, mapping/surveying, crop-dusting/spraying, and others agricultural uses. UAVs have been also been considered for lab sample pick-up and delivery, aerial spraying, public space monitoring and guidance. Finally, drones have emerged as a promising path to conservation and sustainability, including, for example, climate change assessments and habitat monitoring.

While drone concepts are exciting, most are largely still out of reach due to short flight times, maintenance, and cost. Few drone-based technologies have been witnessed despite tons of interesting and novel concepts introduced. Short flight endurance is one of the main issues. Many traditional drones require dedicated take-off and landing spaces and do not support hovering. Vertical take-off and landing (VTOL) drones have been recently considered as they can support long-endurance (a few hours) with the ability for vertical take-off, landing, and hovering. Unfortunately, they are typically expensive, difficult to control, and require special pilot training. In addition, they are often unstable due to transitions from vertical take-off to flying because the procedure of changing propeller directions is complex and poses potential failures. Last but not least, these traditional drones are powered by LiPo batteries, and the capacities of these batteries often reduce significantly after a few weeks due to the high current discharges required during take-off and flying.

As discussed above, the trade-off between battery energy storage and weight is a main constraint for the flight times of unmanned aerial vehicles (UAV). Even for UAVs that recharge their batteries mid-flight, eventually, the batteries must be replaced. As such, there is still a desire for UAVs that can provide near-zero maintenance and long-term flight.

The description provided in the background section should not be assumed to be prior art merely because it is mentioned in or associated with the background section. The background section may include information that describes one or more aspects of the subject technology.

SUMMARY

According to certain aspects of the present disclosure, an unmanned aerial vehicle is provided. The unmanned aerial vehicle includes a four-bar linkage mechanism in mechanical communication with a pair of wings. An electrical subsystem includes an actuator in mechanical communication with the four-bar-linkage mechanism. The actuator is in electrical communication with a capacitor. A plurality of solar panels is in electrical communication with the capacitor, which is configured to harvest non-battery energy from the plurality of solar panels to power the actuator for controlling the four-bar linkage mechanism to operate the pair of wings.

According to another aspect of the present disclosure, an unmanned aerial vehicle is provided. The unmanned aerial vehicle includes a plurality of wings. An electrical subsystem is configured to control the plurality of wings. A flapping system is in mechanical association with the plurality of wings. The flapping system is in mechanical association, and in electrical communication, with the electrical subsystem. The electrical subsystem is configured to actuate the flapping system to control the plurality of wings. A plurality of solar panels is in electrical communication with the electrical subsystem. A capacitor of the electrical subsystem is configured to harvest non-battery energy from the plurality of solar panels to power the electrical subsystem for controlling the flapping system to operate the plurality of wings.

According to yet another aspect of the present disclosure, an unmanned aerial vehicle is provided. The unmanned aerial vehicle includes a four-bar linkage mechanism. A pair of wings is in mechanical communication with the four-bar-linkage mechanism. An actuator is in mechanical association with the four-bar-linkage mechanism. The actuator is in electrical communication with a capacitor. A plurality of solar panels is in electrical communication with the capacitor. The capacitor is configured to harvest non-battery energy from the plurality of solar panels to power the actuator for controlling the four-bar linkage mechanism to operate the pair of wings. A microcontroller is in electrical communication with the actuator. The microcontroller is in wireless communication with a UAV controller for controlling the actuator. At least one RC micro-servo motor is in electrical communication with the microcontroller. At least one tail is in mechanical association with the at least one RC micro-servo motor.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different views.

FIG. 8 is a chart illustrating comparisons of solar panels.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The disclosed technology provides a battery-free, energy harvesting, and small-sized Unmanned Aerial Vehicle (UAV). For many traditional UAVs, flight times are severely constrained due to being forced to navigate the trade-off between battery energy storage and weight. Even for traditional UAVs that recharge their batteries mid-flight, eventually, the batteries must be replaced. The disclosed technology, thus, provides improved UAVs that can survive entirely off energy harvested from the sun. As disclosed herein, these UAVs store energy momentarily in small super-capacitors before using that energy to create lift. By removing the requirement for battery recharging and replacement, these UAVs can provide extended flight times and open up new applications. Many factors significantly affect UAV performance such as, but not limited to, wing structure, UAV type, motor and harvester efficiency, environmental effects, and other factors. In certain aspects of the disclosure, the UAV is an ornithopter-like UAV with a solar rack on top and a single BLDC motor. Such an UAV could enable numerous new applications that require large-scale, sustained aircraft flight, such as, but not limited to, wildfire monitoring, smart agriculture, and urban air quality assessment.

Figure 1:
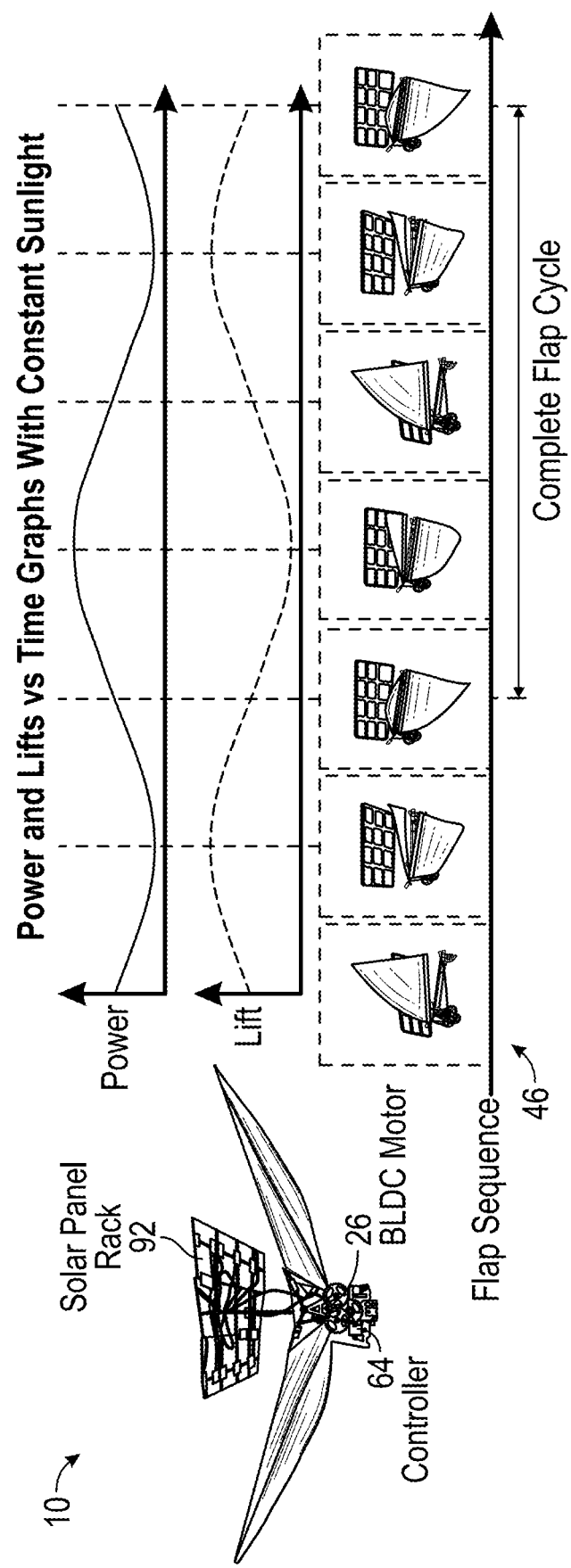
FIG. 1 illustrates a battery-free unmanned aerial vehicle (UAV) according to certain aspects of the present disclosure.

FIG. 1 illustrates an embodiment of an UAV 10 that is, for example, an ornithopter, as in it flaps to generate lift and uses a solar rack (or parachute) to gather energy to power all operations. For example, when launched from eye height, the battery-free UAV 10 is able to stay aloft under its power.

Figure 2:
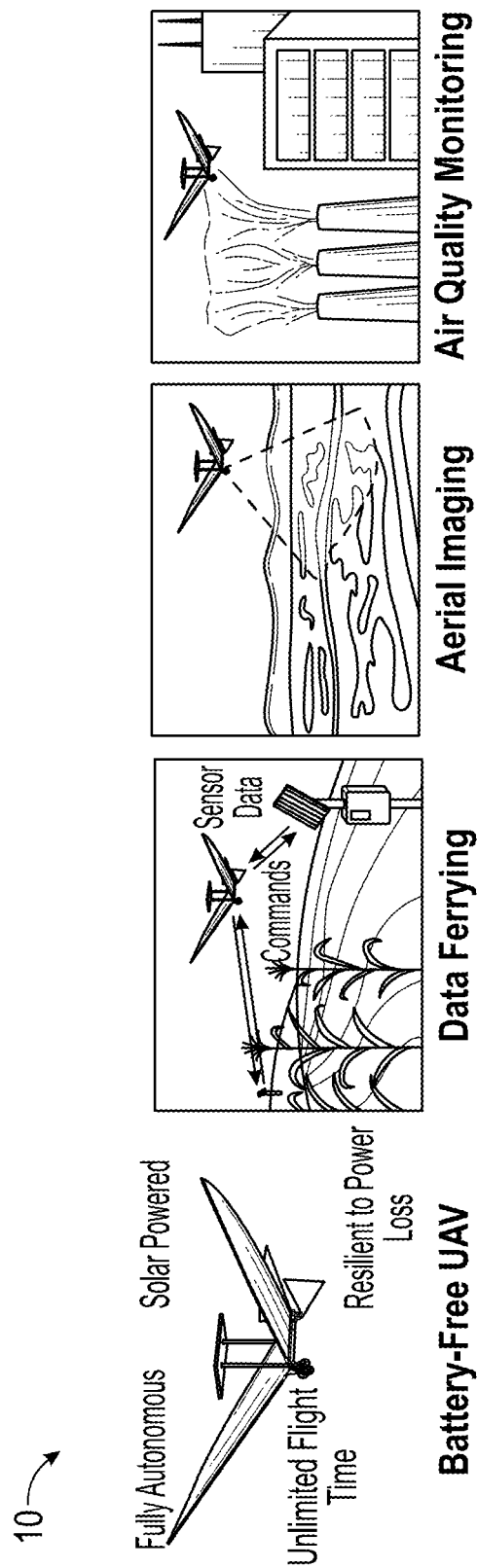
FIG. 2 illustrates exemplarily applications for the battery-free UAV of FIG. 1 according to certain aspects of the present disclosure.

While lithium-ion batteries are commonly used for UAV design, they are often not suitable for hazardous environments such as wildfire monitoring since the electrolyte consists of lithium salt and organic solvents, which can lead to fire hazards or explosion. More importantly, batteries add weight costs and require charging or replacement, shortening aerial time. A battery-free UAV provides the opportunity for ultra-long multi-day missions, low maintenance, and a lower ecological impact. As described in more detail below, the disclosed solar-powered UAV with low power consumption can eliminate usage of a battery and can operate entirely from the energy harvested from sunlight. By removing the battery recharging and replacement requirements, such UAVs can provide extended flight times. New applications emerge with this extended flight time, including, but not limited to, data ferrying, aerial imaging, air quality monitoring, and others. As exemplified in FIG. 2, the battery-free UAV 10 can be a critical device for future large-scale monitoring applications that must be sustainable and have low maintenance.

In certain aspects, a 99.89 g battery-free UAV 10 with an 84 cm wingspan is provided. In such aspects, for example, the disclosed UAV 10 provides sufficient energy to flap at 4 Hz frequency with a maximum power of 3 W in daily sunlight conditions.

Figure 3:
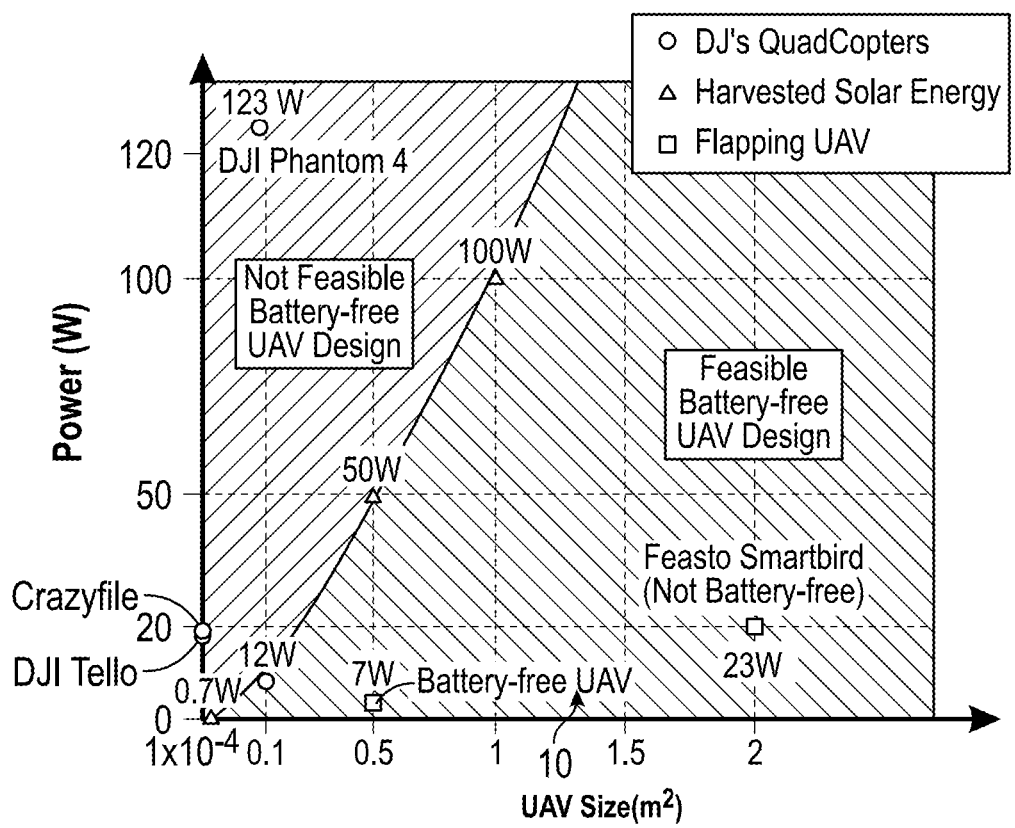
FIG. 3 is a chart illustrating the relationship between power consumption and size of some commercial quadcopters, flapping UAVs, and the disclosed battery-free UAV of FIG. 1.

Compared to multi-rotors and fixed-wing UAVs, a flapping UAV is the most efficient flying mechanism that supports a reasonably large coverage area. To be specific, commercial micro multi-rotors UAVs, for example, consume roughly 20 W of power, as shown in FIG. 3. Larger drones, for example, require more than 100 W of power to operate. Additionally, multi-rotor UAVs require a relatively high continuous electric current to actuate their motors. Without the desired current, multi-rotor UAVs cannot generate any lift and cannot control their aerial balance and stability. Flapping-wing UAVs, on the other hand, have higher efficiency compared with multi-rotor UAVs as the main lift force of multi-rotor UAVs comes from the propellers, requiring a considerable amount of power to operate compared to flapping-wing similar-sized UAVs. Subsequently, while flapping-wing and fixed-wing UAVs require similar energy since they both are able to operate with one main motor (i.e., controlling the wings in flapping UAV and rotating the main propellers in fixed-wing), flapping-wing outperforms both of them in hovering and low-speed operation performance. With reference to FIG. 3, considering Ascent solar BARE model, the energy required by the common quad-copter drones, state-of-the-art flapping-wing drone (Festo Smartbird), and the potential harvested energy per square meter is illustrated. As can be seen in FIG. 3, one embodiment of a flapping UAV 10 can utilize solar power to support its operation with a size of 0.5 m².

Figure 4:
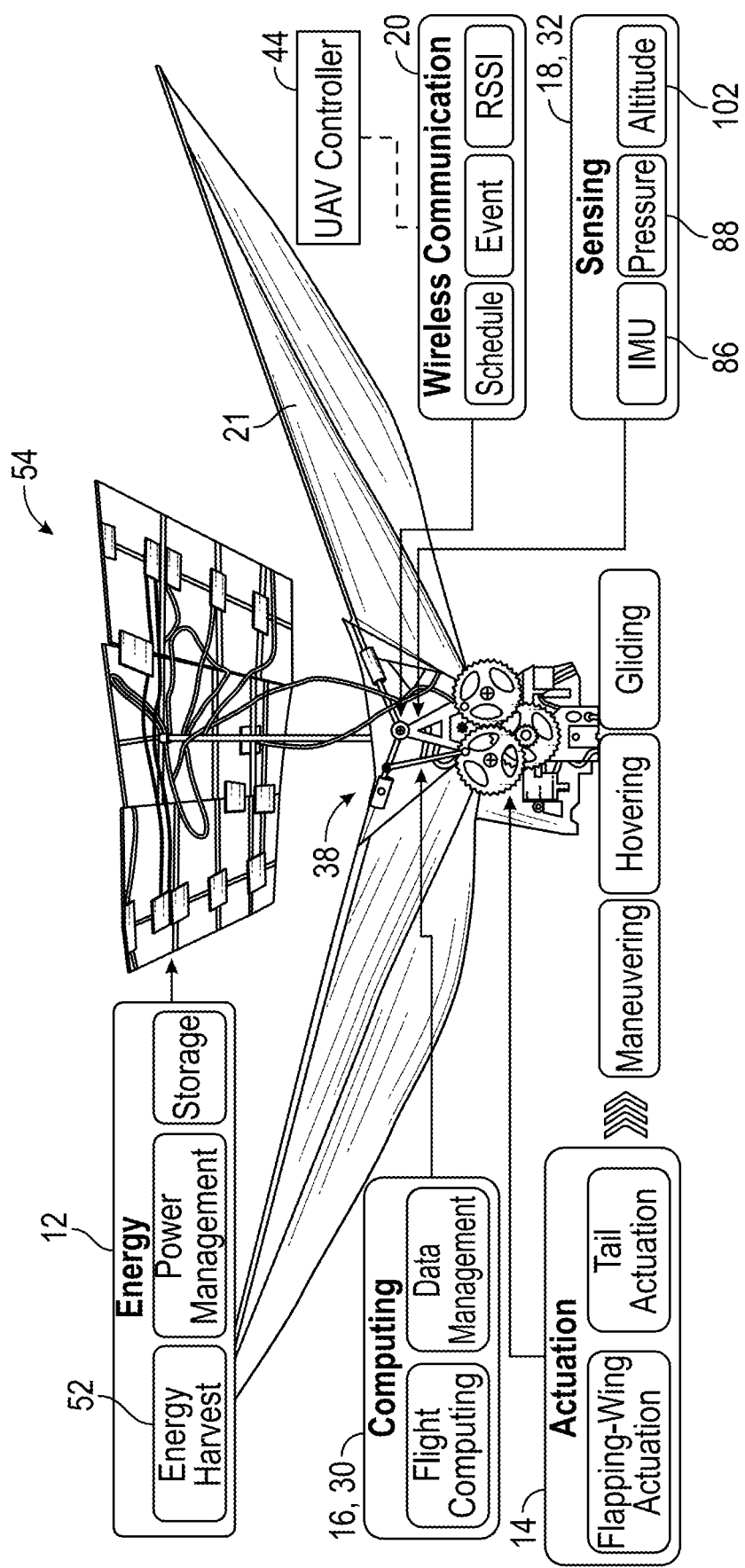
FIG. 4 illustrates an embodiment of a battery-free UAV according to certain aspects of the present disclosure.

The disclosed technology provides a flapping-wing UAV that can operate using the energy harvested from the environment (i.e., solar power). With reference to FIG. 4, an embodiment of unmanned aerial vehicle (UAV) 10, such as a Battery-free UAV system, is depicted. The battery-free UAV 10 includes five main components: (1) an Energy harvesting and management 12, (2) an Actuation control system 14, (3) a Computing system 16, (4) a Sensing system 18, and (5) a Communication system 20. The entire UAV 10 is powered by energy harvested from a plurality of solar panels 22, such as for example, 12 solar cells, placed on the body 90 of the UAV 10 above the wings 21. The harvested energy is stored in at least one super-capacitor 22 in electrical communication with the plurality of. A lightweight, efficient and durable flapping system 24, including a power transmission mechanism 28 in mechanical association with an actuator 26, provides sufficient lift and thrust forces to fly the UAV 10. The main computing unit 30 of the UAV 10 includes flight control and data management to collect data from the plurality of sensors 32 (i.e., IMU 86, pressure sensors 88, altitude sensor 102) to flap and maneuver. In certain aspects, the UAV 10 supports Bluetooth communication allowing for remote control of the UAV 10 in real-time.

The electrical subsystem 34 (including at least the actuator 26, the capacitor 22, the microcontroller 64, the aluminum electrolytic capacitor 62, and the circuits 76) and the mechanical flapping system 24 (including at least the power transmission mechanism 28, the plurality of gears 36, the four-bar linkage mechanism 38, the coupler bar 48, the rocker-arm 50) are the main components of the UAV 10. The components of the electrical subsystem 34 are in electrical communication with one another. In certain aspects, the electrical subsystem 34 of the UAV 10 utilizes, for example, a Brushless DC (BLDC) motor, as the main actuator 26 due to its efficiency, torque, and weight. The plurality of gears 36 (i.e., crank gear 94, first speed reduction gear 98, second speed reduction gear 100) and the power transmission 28 then convert the rotation of the motor (i.e., the actuator 26) to the flapping motion of the wings 21 as long as the torque relationship of the system is satisfied. A four-bar linkage mechanism 38 of the UAV 10 is designed to convert the rotational motion to flapping motion. The UAV 10 also has at least one tail 40 to balance the momentum and maneuver the flying direction. The UAV 10 includes at least one RC servo motor 42, which are used to direct the system in Azimuth and Elevator angles. In certain aspects, the main motor (i.e., the actuator 26) of the UAV 10 is controlled by, a microcontroller 64, for example, an Apollo3 Blue MCU from Ambiq, which communicates wirelessly with the UAV controller 44 through Bluetooth to receive commands from the UAV controller 44 to control the actuator 26.

Figure 5:
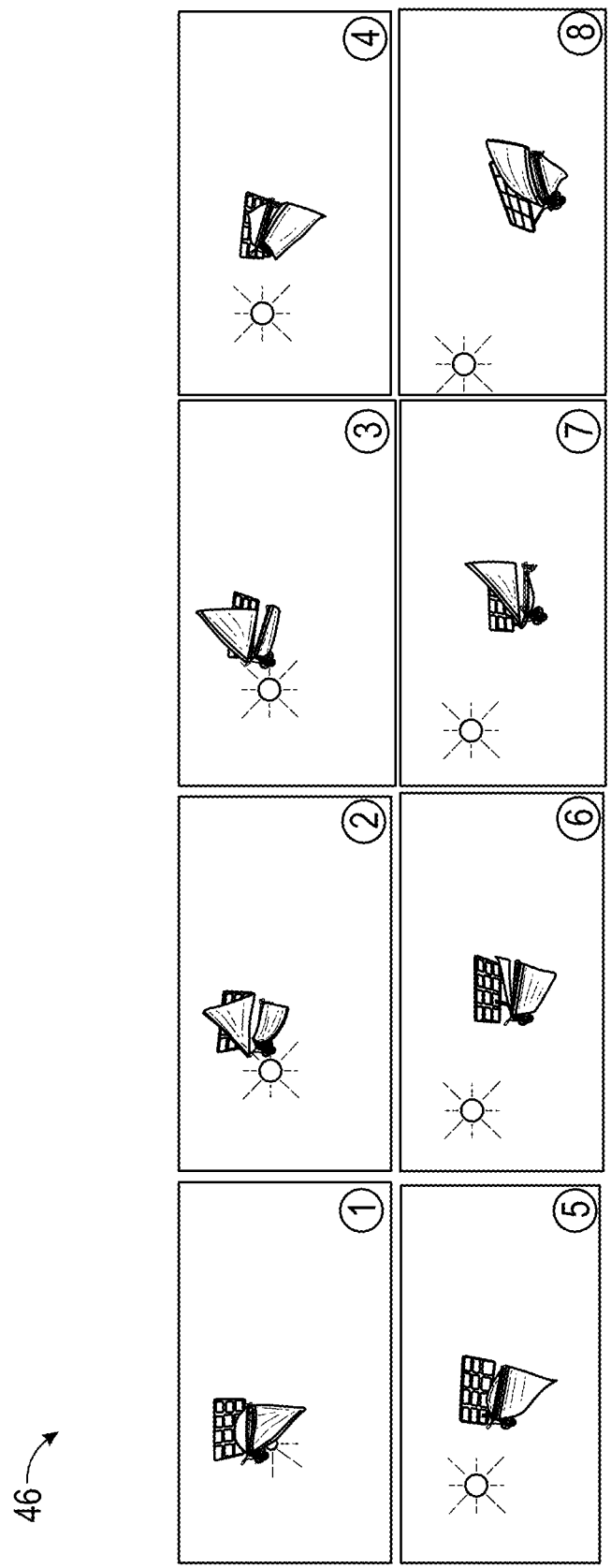
FIG. 5 illustrates an example flight sequence of the battery-free UAV, according to certain aspects of the present disclosure.

The UAV 10 harvests energy from outdoor sunlight and stores energy momentarily in small super-capacitors (i.e., capacitor 22) before using that energy to create lift via the actuator 26 controlling the flapping system 24. FIG. 5 illustrates an example flight sequence 46 of the UAV (e.g., battery-free ornithopter).

Figure 6:
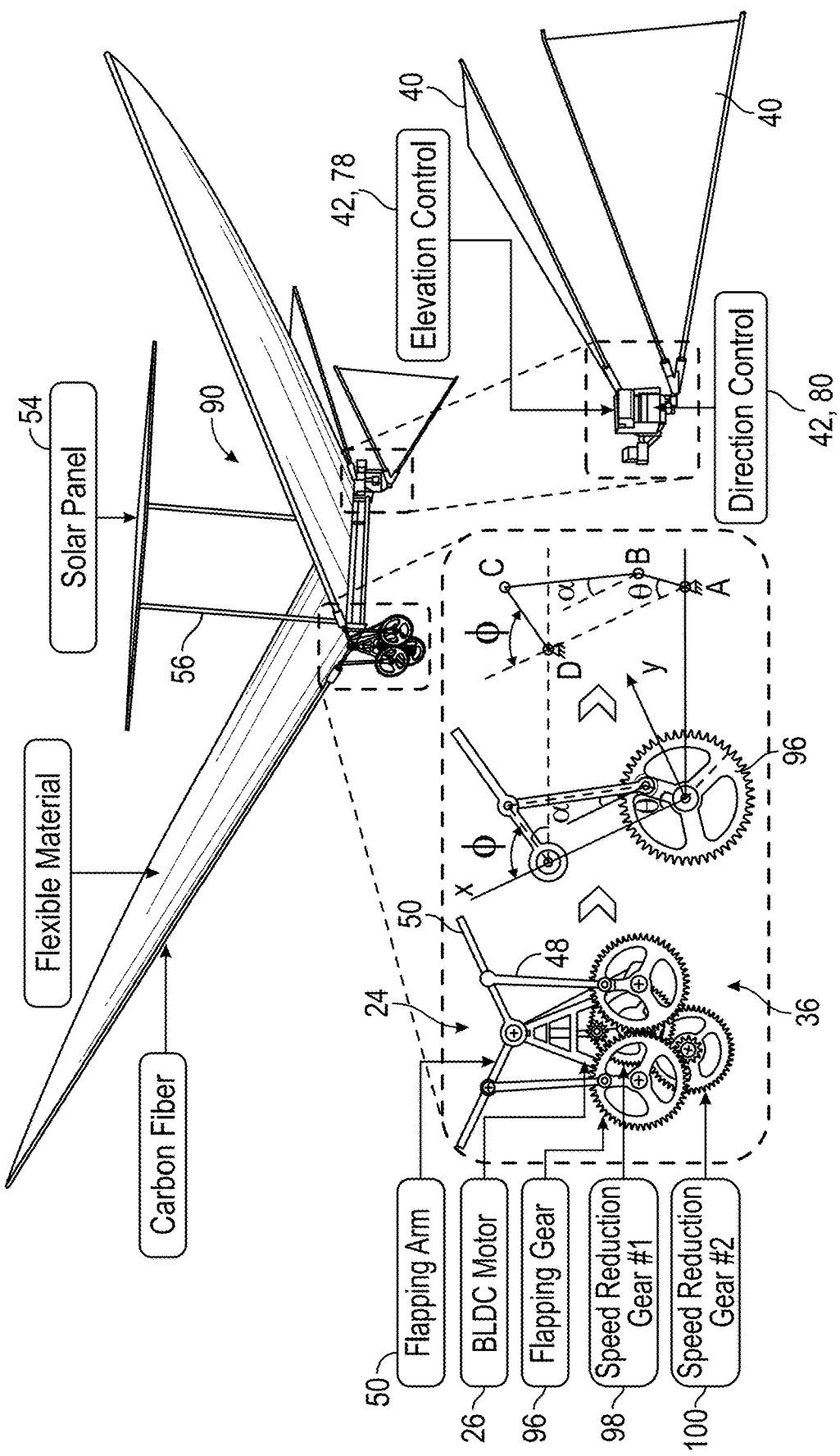
FIG. 6 illustrates a four-bar-linkage flapping mechanism of a battery-free UAV, according to certain aspects of the present disclosure.

Referring to FIG. 6, an embodiment of the UAV 10 is illustrated. The UAV 10 includes a flapping mechanism, such as the flapping system 24, based on the change of φ angle. The UAV 10 also includes the BLDC motor (i.e., the actuator 26), the four-bar linkage mechanism 38, a coupler bar 48, and a flapping arm or rocker-arm 50. Note that θ is the angular displacement of the four-bar linkage, α is the coupler bar angle, φ is the rocker-arm angle, and A, B, C, D are attached points of the components in the four-bar linkage mechanism 38. By changing the angle θ using the designed BLDC motor (i.e., the actuator 26), the flapping angle φ is precisely controlled. This embodiment of the UAV 10 overcomes many issues related to durability, reliability, and lightweight. As discussed in more detail below, the UAV also includes an energy harvesting device 52 of the energy harvesting and management system 12.

Figure 7:
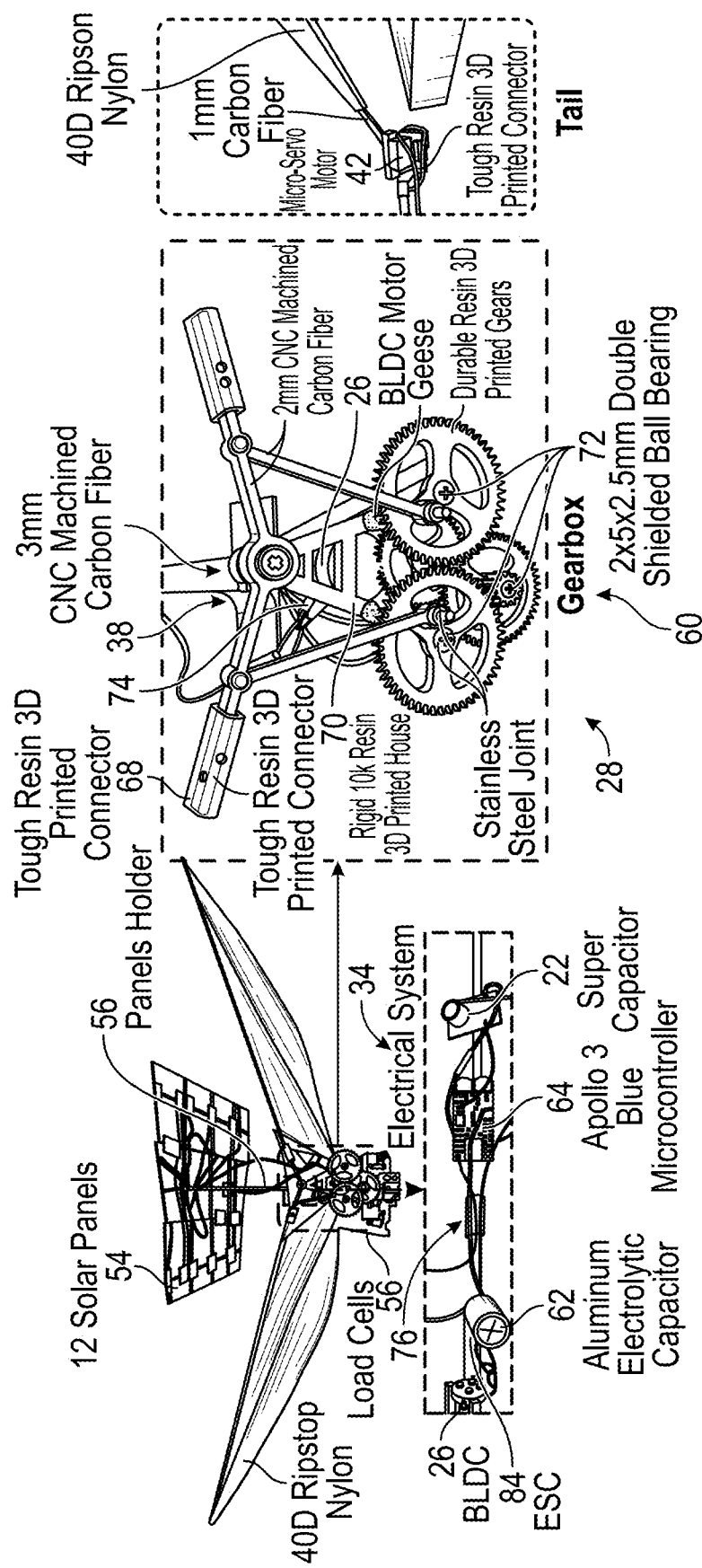
FIG. 7 illustrates components of a battery-free UAV, according to certain aspects of the present disclosure.

The mechanical connections of the UAV 10 are on the same plane (2-D mechanism) and, therefore, allows manageable mechanical positioning and fabrication, as illustrated in FIG. 7. The UAV 10 includes a plurality of solar panels 54, a panel holder 56, the pair of wings 21, loads cells 58, the electrical subsystem 34, a gear box 60, and the at least one tail 40. In certain aspects, the plurality of solar panels 54 include 12 solar panels, but any number of solar panels is within the scope of the present disclosure. In certain aspects, the electrical subsystem 34 also includes at least an aluminum electrolytic capacitor 62, a microcontroller 64, and the super capacitor 22. In certain aspects, the gearbox 60 includes a body bar 66, a connector 68, a house 70, the plurality of gears 36, the BLDC motor (i.e., the actuator 26), and shielded ball bearings 72. In certain aspects, the at least one tail 40 includes the least one RC micro-servo motor 42 and a motor connector 74. In certain aspects, the house 70 can be a rigid 10k resin, for example, from Formlabs. The plurality of gears 36 of the UAV 10 are lightweight. In certain aspects, the body bar 66 is computed numerical controlled (CNC) machined by a 3 mm carbon fiber plate with multiple mounts for the house 70, the at least one tail 40, circuits 76, and the plurality of solar panels 54.

In certain aspects, the motor (i.e., the actuator 26) is rated at 5Kv and weighs 5.9 grams. The motor (i.e., the actuator 26) can work well up to 3 s (11.7V). In certain aspects, the plurality of solar panels 54 works at 4.6V; therefore, the rated speed is 4.5×5000=23,000 rpm, equal to 383.3 Hz of flapping frequency. The gear ratio of the plurality of gears 36 is designed to reduce the flapping to 4 Hz, which needs a 96:1 reduction ratio. In certain aspects, a 70:1 reduction ratio with two reduction gears (e.g., the first speed reduction gear 98 and the second speed reduction gear 100) is implemented instead due to the spatial constraint. In certain aspects, for example, Durable Resin from Formlabs is chosen due to the wear resistance. In certain aspects, the motor (i.e., the actuator 26) and the gearbox 60, which weigh 26.54 grams, work reliably for five hours without load. In certain aspects, certain components described above are manufactured with a 3D printing technique called stereolithography (SLA), which has better resolution and properties than the Extruding technique.

It is noted that: (1) The lift coefficient depends on the flexibility of the wings 21, the materials, and also the straightness; (2) There is no evidence to optimize the wing geometry and structure; (3) The more weight on the wings, the more torque is needed to run the motor. In certain aspects, the pair of wings 21 are CNC machined carbon fiber. In certain aspects, the wing spar of the wings 21 is 3 millimeters. In certain aspects, the pair of wings 21 include three spars as a triangular wingspan of 820 millimeters. In certain aspects, for example, 40D Ripstop Nylon makes the wings 21 sewed on the carbon fiber spars with Durable 3D Printed connections. As depicted in FIG. 6, the at least one tail 40 includes two main direction controllers, such as an elevation controller 78 and a direction controller 80, that allow the UAV 10 to change its elevation and direction while flying. In certain aspects, the at least one tail 40 of the battery-free UAV 10 leverages the two low-power, lightweight RC micro-servo motors 42, such that a first RC micro-servo motor of the RC micro-servo motors 42 acts as the elevation controller 78 and a second RC micro servo motor of the RC micro-servo motors 42 acts as the direction controller 80.

In certain aspects, the main components of the electrical subsystem 34 includes at least an electronic speed controller (ESC) 84, the main computing unit 30, the plurality of solar panels 54, an Inertial Measurement Unit (IMU) 86, and pressure sensors 88.

In certain aspects, the ESC 84 can work from 3V to 8V and supply up to 7 A peak and 4 A continuous and has a weight of 0.96 grams. In certain aspects, the average parasitic power draw of the ESC 84 is 32.86 mW.

The Battery-free UAV 10 is controlled by the main computing unit 30. In certain aspects, the main computing unit 30 is, for example, a Sparkfun redboard artemis nano development board. In such aspects, the main computing unit 30 incorporates, for example, an Ambiq Apollo3 Blue microcontroller (i.e., the microcontroller 64), which is one of the lowest power mcu available with BLE built in, although other microcontrollers are well within the scope of the present disclosure. The microcontroller 64 has 1 MB flash and 384k RAM and runs at runs at 48 MHz with a 96 MHz turbo mode and requires 6 μA/Hz. The microcontroller 64 also interfaces with a low power 6DoF IMU (LSM6DSL) and the pressure sensor 88. The microcontroller board along with the required voltage regulation circuits have a parasitic power draw of 10.77 mW.

The weight of the plurality of solar panels 54 is dominate so the Battery-free UAV is designed to maximize power-to-mass ratio. The Table illustrated in FIG. 8 compares solar panels. While multi-junction GaInP/GaAs/Ge have the highest power-to-area ratios they are extremely fragile and expensive. Due to their fragile nature they would require a thick encapsulation to improve their durability which would further decrease its power-to-mass ratio. On the other hand Silicon cells have a significantly worse power-to-mass ratio compared with the Ascent Solar cell. In certain aspects, for example, CIGS solar cells are implemented due to having one of the best power-to-mass ratios on the market and being extremely durable and flexible, although other solar cells are well within the scope of the present disclosure. In certain aspects, the plurality of solar panels 54 are connected in a 1s12p configuration to give a peak voltage of 4.8V and current of 1.7 A at 1000 W/m².

In certain aspects, the plurality of solar panels 54 are suspended on top of the body 90 of the UAV 10 using carbon fiber rods. This design improves solar panel efficiency and also improves the lift force generated by the system.

In the following discussion, the relationship between the flapping wings and the generated lift and thrust forces of the UAV 10 will be described. Due to the unsolvable and complex behaviors of fluid dynamics, the existing technique linearizes the relationship between force and flapping frequencies and other parameters and considers the average lift and drag forces over a long period. For example, the aerodynamic model of the flapping-wing UAV is composed of the aerodynamic model of the fixed-wing UAV moving in the air and the aerodynamic of flapping-wings in the static air. Thus, the lift and thrust forces of the UAV can be expressed by the coefficients as follows:

$$\vec{F}_{lift} = \tfrac{1}{2}\rho(A_1 C_{1L} v_{UAV}^2 + A_2 C_{2L} v_{wing}^2);$$

where the arrows indicate: air density, UAV's veloc., wing's area, wing's veloc., UAV's eff. area, UAV's lift coeff., wing's lift coeff.

$$\vec{F}_{thrust} = \tfrac{1}{2}\rho(A_2 C_T v_{wing}^2 - A_1 C_D v_{UAV}^2);$$

where the arrows indicate: air density, wing's veloc., UAV's eff. area, UAV's veloc., wing's area, wing's thrust coeff., UAV's drag coeff.

The lift force is composed of (1) the lift force contributed by the entire UAV and (2) the lift force contributed by the flapping wings. Similarly, the thrust force can also be decomposed into forces coming from the entire UAV 10, and the wings separately. Hence, in some scenarios in which the UAV 10 (e.g., the ornithopter) has an initial velocity or the wind condition is sufficient, the required lift force for the UAV 10 is much less than usual conditions; thus, reducing the power consumption significantly. Furthermore, the solar panel rack 92 on the UAV 10 having a relatively large surface area in the positive attack angle position also greatly contributes to the entire UAV's lift force. This structure elaborates why the UAV 10 can fly with the limited harvested energy from the sun. The aerodynamics also implicitly suggests that whenever the UAV reaches a certain velocity or flies in a satisfactory wind condition, the lift force generated by the entire UAV 10 can win the gravity, and the UAV 10 can fly without making any flapping efforts. Such flying characteristics also propose the UAV's gliding mode and possibly the UAV's intermittent flapping mechanism in future work.

Dynamic and Kinetic (Power Transmission) Modeling. The feasibility of the battery-free UAV 10 relies not only on what we know about the aerodynamic generation procedure but also on how we comprehend the energy consumption behavior and the relationship between the energy and flapping behavior. The relationship between the energy, the motor (i.e., the actuator 26), the power transmission mechanism 28, and the flapping wings 21 includes (1) the positional relationship (Kinematic Modeling), (2) torque and force relationship (Dynamic Modeling), and energy behavior and consumption relationship (3) Motor Modeling.

Kinematic Modeling. In order to fly, the UAV 10 needs to transform simple harmonic motion (SHM) to reciprocation, and the four-bar linkage mechanism 38 is designed in terms of the kinematic model. The kinematic model provides a mathematical description that provides the functional dimensions, degrees of freedom, and the positional capabilities or constraints of the UAV 10. Note that in this kinematic model, the torque generated by the motor (i.e., the actuator 26) can be satisfied enough, whereas the force of the air applied on both wings 21 does not exceed the torque generated by the motor (i.e., the actuator 26), and the thrust force and lift force are sufficient for the UAV 10 to fly. The four-bar linkage mechanism 28 is illustrated in FIG. 6. As depicted in half of the four-bar linkage mechanism 28 (for ease of discussion, the other half, being a mirror version, will not be discussed), A, B, C, and D are denoted as the center A of the flapping gear or crank gear 94 of the plurality of gears 36, the attachment point B of the coupler bar 48 to the flapping gear or crank gear 94, the attachment point C of the coupler bar 48 to the rocker-arm 50, and the position D of one end of the flapping arm or rocker-arm 50, respectively. Placing the origin of coordinates system at A and knowing that A and D do not change their position over time, the relative positions of B and C with respect to A are computed as follows:

| | |
|---|---|
| $x_B = t_1 \cdot \cos\phi$ | $(x_C - x_B)^2 + (y_C - y_B)^2 = t_2^2$ |
| $y_B = t_2 \cdot \sin\phi$ | $(x_C - x_D)^2 + (y_C - y_D)^2 = t_3^2$ |

Solving the above system of equations with given positions of A and D and choosing the most appropriate solution for B and C based on constraints plane (see FIG. 6), B=$(x_B, y_B)$ and C=$(x_C, y_C)$ is obtained. Simulating simple harmonic motion on θ over a time domain t with infinitesimal Δt, we transform SHM from the motor into a reciprocating movement on the rocker-arm angle, φ.

Dynamic Modeling. The design illustrated in FIG. 6 satisfies the assumption in Kinematic Modeling were satisfied by using dynamic modeling throughout Matlab simulations. It is noted that the dynamic model is a mathematical model that derives equations describing the relationship between forces and torques within a closed system. Lagrangian mechanics is often used to derive the relationship between the torque generated by the motor and the torque of the wings, written as $\mathcal{L} \triangleq T-V$, where $\mathcal{L}$, where is the function that describes the state of motion of the system, and T and V are the kinetic energy and potential energy of the system, respectively. Here, the equation of motion based on Lagrangian mechanics is used to establish the relationship between the wing torque and the motor torque. The equation of motion is expressed as:

equation of motion $$\underbrace{d/dt(\partial L/\partial\theta) - (\partial L/\partial\theta)}_{} = \underbrace{[d/dt(\partial T/\partial\theta)] - (\partial T/\partial\theta)}_{\text{kinetic energy part}} - \underbrace{[d/dt(\partial V/\partial\theta) - (\partial V/\partial\theta)]}_{\text{potential energy part}} = \tau_{ext}$$

external torques applied on closed system (1)

It is noted that in other systems, the potential energy in Lagrange's equation is usually set as 0 since the four-bar linkage mechanism 38 system is in a plane that is always perpendicular to the gravitational vector; hence, potential energy does not contribute to the Lagrangian mechanics. However, in flapping-wing UAVs, there is potential energy contributing to the Lagrange's equation as the wings 21 flap continuously. More specifically, the total kinetic energy and the potential energy are calculated, respectively:

$$T = \frac{1}{2}[J_{1_l} + J_{2_l}S_1^2 + J_{3_l}S_2^2 + 2P_1C_1S_1]\dot{\theta}^2 \quad (2)$$

-continued $$V = mgL \cdot \sin \phi_b - 2 \tan^{-1} \frac{2l_1l_3\sin\theta \pm 4(l_1l_3\sin\theta)^2 - (l_0^2 + l_1^2 - l_2^2 + l_3^2 - 2l_0l_1\cos\theta)^2 + 4(l_3(l_0 - l_1\cos\theta))^2}{l_0^2 + l_1^2 - l_2^2 + l_3^2 - 2l_0l_1\cos\theta - 2l_3(l_0 - l_1\cos\theta)} \quad (3)$$

As we can express both kinetic energy (Eq. 2) and potential energy (Eq. 3) of the system in terms of θ and θ̇, we can obtain the equations of motions for the subsystems (one closed system is the gear train and the four-bar linkage on the right, while another is the four-bar linkage on the left) by applying the equation of motion (Eq. 1):

$$\frac{d}{dt}\frac{\partial \mathcal{L}_{right}}{\partial\dot\theta} - \frac{\partial \mathcal{L}_{right}}{\partial\theta} = \tau_{wing} + \tau_{transition} - \tau_{input}; \quad (4)$$

$$\frac{d}{dt}\left(\frac{\partial \mathcal{L}_{Left}}{\partial\dot\theta}\right) - \left(\frac{\partial \mathcal{L}_{Left}}{\partial\theta}\right) = -\tau_{wing} + \tau_{transition}$$

As for the torque of the motor (i.e., the actuator 26), we establish the relationship of the torque applied on the first closed system of the UAV, $\tau_{input}$, and the torque generated by the motor (i.e., the actuator 26), $\tau_{motor}$, by multiplying the transition coefficient, Γ, of 1/35 and the coefficient of performance, COP as follows:

$$\tau_{input} = COP \cdot \Gamma \cdot \tau_{motor} \quad (5)$$

Solving system of Eq. 4 with the known input torque for the four-bar linkage mechanism 38 from Eq. 5, we obtain the torque of the wings 21 with the assumption that two wings of the UAV 10 produce the same torque. Simulating the input torque with the variable $\tau_{input}$ over a time domain t, we get the formula for $\tau_{wing}$ variable as below:

right wing's equation of motion $$\tau_{wing} = \frac{1}{2}[\underbrace{(d/dt(\partial L_{right}/\partial\dot\theta) - (\partial L_{right}/\partial\theta))}_{} - \underbrace{(d/dt(\partial L_{left}/\partial\dot\theta) - (\partial L_{left}/\partial\theta))}_{\text{left wing's equation of motion}} + \underbrace{COP}_{\text{confident of performance}} \underbrace{\Gamma}_{\text{transition coefficient}} \underbrace{\tau_{motor}}_{\text{motor's torque}}]$$

Hence, the relationship between the torque of the motor (i.e., the actuator 26) and the torque of the wing 21 has been established.

Motor Modeling: In certain aspects, the UAV 10 utilizes the linearized BLDC model, which can be stated as below:

$$\omega = K_V \cdot V; K_T = \frac{1}{K_V}; \tau = K_T \cdot I$$

where $K_T$ is the motor torque constant, $K_V$ is the motor speed constant, I is the current, V is voltage, τ is torque, and ω is the angular velocity.

Understanding the relationship between the energy, flapping wings, and lift/thrust force established from multiple analyses mentioned above provides many insights related to the behaviors of flapping wing UAV.

In certain aspects, the UAV 10 includes a Proportional Integral Derivative (PID) control loop to stabilize the flight of the UAV 10. In certain aspects, the UAV 10 includes a PCB with all of the electronics to reduce weight as well as parasitic losses due to resistance.

In certain aspects, the UAV 10 includes an energy-ware control method to allow the Battery-free UAV 10 to control its position, orientation and trajectory based on energy available from the environment. The energy aware control can be designed to enable the Battery-free UAV 10 to control its position, orientation and trajectory based on energy available from the environment. The energy aware control can include algorithms that steer into a direction to get more lift or thrust force from the wind or changing the orientation of the Battery-free UAV 10 to point towards the sunlight to increase energy collected.

In certain aspects, instead of solar energy, the battery-free UAV can use wind and/or vibration based energy harvesting and energy storage to optimize the system.

What is claimed is:

1. A battery-free unmanned aerial vehicle, comprising:
   a four-bar linkage mechanism;
   a pair of wings in mechanical communication with the four-bar-linkage mechanism;
   an electrical subsystem comprising an actuator in mechanical communication with the four-bar-linkage mechanism, the actuator in electrical communication with a super capacitor; and
   a plurality of solar panels in electrical communication with the super capacitor, wherein the super capacitor is configured to harvest non-battery energy from the plurality of solar panels to entirely power the actuator for controlling the four-bar linkage mechanism to operate the pair of wings.

2. The unmanned aerial vehicle of claim 1, further comprising at least one tail in electrical communication with the electrical subsystem.

3. The unmanned aerial vehicle of claim 2, further comprising at least one RC micro-servo motor in mechanical communication with the at least one tail and in electrical communication with the electrical subsystem.

4. The unmanned aerial vehicle of claim 3, wherein the at least one RC micro-servo motor comprises a first RC micro-servo motor configured to control elevation and a second RC micro-servo motor configured to control direction.

5. The unmanned aerial vehicle of claim 4, further comprising a microcontroller in electrical communication with the actuator and the at least one RC micro-servo motor, wherein the microcontroller is in wireless communication with a UAV controller for controlling the actuator and the at least one RC micro-servo motor.

6. The unmanned aerial vehicle of claim 5, further comprising a plurality of sensors in electrical communication with the microcontroller, wherein the plurality of sensors comprises one of an inertial measurement unit, a pressure sensor, and an altitude sensor.

7. The unmanned aerial vehicle of claim 6, further comprising an electronic speed controller in electrical communication with the microcontroller.

8. The unmanned aerial vehicle of claim 1, wherein the four-bar-linkage mechanism includes one degree of freedom.

9. A battery-free unmanned aerial vehicle, comprising:
   a plurality of wings;
   an electrical subsystem configured to control the plurality of wings;
   a flapping system in mechanical association with the plurality of wings, wherein the flapping system is in mechanical association, and in electrical communication, with the electrical subsystem, wherein the electrical subsystem is configured to actuate the flapping system to control the plurality of wings; and
   a plurality of solar panels in electrical communication with the electrical subsystem, wherein a super capacitor of the electrical subsystem is configured to harvest non-battery energy from the plurality of solar panels to entirely power the electrical subsystem for controlling the flapping system to operate the plurality of wings.

10. The unmanned aerial vehicle of claim 9, further comprising at least one tail in electrical communication with the electrical subsystem.

11. The unmanned aerial vehicle of claim 10, further comprising at least one RC micro-servo motor in mechanical communication with the at least one tail and in electrical communication with the electrical subsystem.

12. The unmanned aerial vehicle of claim 11, wherein the at least one RC micro-servo motor comprises a first RC micro-servo motor configured to control elevation and a second RC micro-servo motor configured to control direction.

13. The unmanned aerial vehicle of claim 12, wherein the electrical subsystem comprises a microcontroller, wherein the microcontroller is in wireless communication with a UAV controller for controlling the flapping system.

14. The unmanned aerial vehicle of claim 13, further comprising a plurality of sensors in electrical communication with the microcontroller, wherein the plurality of sensors comprises one of an inertial measurement unit, a pressure sensor, and an altitude sensor.

15. The unmanned aerial vehicle of claim 14, further comprising an electronic speed controller in electrical communication with the microcontroller.

16. A battery-free unmanned aerial vehicle, comprising:
    a four-bar linkage mechanism;
    a pair of wings in mechanical communication with the four-bar-linkage mechanism;
    an actuator in mechanical association with the four-bar-linkage mechanism, the actuator in electrical communication with a super capacitor;
    a plurality of solar panels in electrical communication with the super capacitor, wherein the super capacitor is configured to harvest non-battery energy from the plurality of solar panels to entirely power the actuator for controlling the four-bar linkage mechanism to operate the pair of wings;
    a microcontroller in electrical communication with the actuator, wherein the microcontroller is in wireless communication with a UAV controller for controlling the actuator;
    at least one RC micro-servo motor in electrical communication with the microcontroller; and
    at least one tail in mechanical association with the at least one RC micro-servo motor.

17. The unmanned aerial vehicle of claim 16, wherein the at least one RC micro-servo motor comprises a first RC micro-servo motor configured to control elevation and a second RC micro-servo motor configured to control direction.

18. The unmanned aerial vehicle of claim 16, further comprising a plurality of sensors in electrical communication with the microcontroller, wherein the plurality of sensors comprises one of an inertial measurement unit, a pressure sensor, and an altitude sensor.

19. The unmanned aerial vehicle of claim 16, further comprising an electronic speed controller in electrical communication with the microcontroller.

20. The unmanned aerial vehicle of claim 16, wherein the plurality of solar panels comprises 12 solar cells.

\* \* \* \* \*